(12) United States Patent
Sugiyama et al.

(10) Patent No.: US 8,750,008 B2
(45) Date of Patent: Jun. 10, 2014

(54) MULTI-PHASE CONVERTER FOR DC POWER SUPPLY WITH TWO CHOPPERS HAVING MAGNETICALLY COUPLED REACTORS

(75) Inventors: Yoshinobu Sugiyama, Toyota (JP); Wanleng Ang, Toyota (JP); Kenji Itagaki, Okazaki (JP)

(73) Assignee: Toyota Jidoha Kabushiki, Toyota (JP)

( * ) Notice: Subject to any disclaimer, the term of this patent is extended or adjusted under 35 U.S.C. 154(b) by 166 days.

(21) Appl. No.: 13/574,289

(22) PCT Filed: Feb. 17, 2010

(86) PCT No.: PCT/JP2010/052339
§ 371 (c)(1),
(2), (4) Date: Jul. 20, 2012

(87) PCT Pub. No.: WO2011/101959
PCT Pub. Date: Aug. 25, 2011

(65) Prior Publication Data
US 2012/0300523 A1 Nov. 29, 2012

(51) Int. Cl.
*H02M 7/537* (2006.01)
*H02M 7/5387* (2007.01)
*H02M 3/24* (2006.01)
*H02M 7/44* (2006.01)

(52) U.S. Cl.
USPC .......... 363/131; 363/95; 363/97; 363/98; 363/132

(58) Field of Classification Search
USPC ............... 363/95, 97, 98, 131, 132
See application file for complete search history.

(56) References Cited

U.S. PATENT DOCUMENTS

| | | | | |
|---|---|---|---|---|
| 6,590,360 | B2* | 7/2003 | Hirata et al. | 318/727 |
| 7,120,037 | B2* | 10/2006 | Komatsu et al. | 363/37 |
| 7,310,475 | B2* | 12/2007 | Okuda et al. | 388/805 |
| 7,348,739 | B2* | 3/2008 | Urakabe et al. | 318/254.2 |
| 7,402,982 | B2* | 7/2008 | Ito et al. | 320/150 |
| 2003/0057914 | A1 | 3/2003 | Kamatsu et al. | |

FOREIGN PATENT DOCUMENTS

| | | |
|---|---|---|
| CN | 1436395 A | 8/2003 |
| JP | A-2003-304681 | 10/2003 |
| JP | A-2006-6073 | 1/2006 |
| JP | B32-3732828 | 1/2006 |
| JP | A-2007-12568 | 1/2007 |
| WO | WO 02/065628 A1 | 8/2002 |

OTHER PUBLICATIONS

International Search Report issued in International Patent Application No. PCT/JP2010/052339 dated Apr. 13, 2010.

* cited by examiner

*Primary Examiner* — Adolf Berhane
*Assistant Examiner* — Emily P Pham
(74) *Attorney, Agent, or Firm* — Oliff PLC (57) ABSTRACT

A power supply device includes: a magnetic-coupling-type multi-phase converter having first and second chopper circuits that respectively adjust respective currents flowing in first and second reactors magnetically coupled to each other, and performing voltage conversion between a DC power supply and a load; and a control circuit. The control circuit includes a determination unit and a current control unit. The determination unit determines whether the temperature of the power supply is lower than a reference temperature. In the case where the power supply temperature is lower than the reference temperature, the current control unit uses a value determined by adding an offset amount to a detected value of the reactor current to set a duty command value for the first chopper circuit and uses a detected value of the reactor current to set a duty command value for the second chopper circuit.

6 Claims, 7 Drawing Sheets

MULTI-PHASE CONVERTER FOR DC POWER SUPPLY WITH TWO CHOPPERS HAVING MAGNETICALLY COUPLED REACTORS

TECHNICAL FIELD

The present invention relates to a power supply device, and more specifically to a power supply device including a multi-phase converter having a magnetic-coupling-type reactor.

BACKGROUND ART

A so-called multi-phase converter made up of a plurality of parallel-connected converters and configured so that these converters are operated with respective phases shifted from each other is known.

Japanese Patent Laying-Open No. 2003-304681 (PTL 1) discloses a hybrid vehicle including a power supply device that uses such a multi-phase converter to step up the voltage of a DC (direct current) power supply and supplies the stepped-up voltage to a load such as motor.

CITATION LIST

Patent Literature

PTL 1: Japanese Patent Laying-Open No. 2003-304681
PTL 2: Japanese Patent Laying-Open No. 2006-6073
PTL 3: Japanese Patent Laying-Open No. 2007-12568

SUMMARY OF INVENTION

Technical Problem

The above-referenced literatures, however, fail to disclose that a multi-phase converter having a magnetic-coupling-type reactor is used to raise the temperature of a DC power supply.

The present invention has been made to solve the above problem. An object of the present invention is to raise the temperature of a DC power supply by increasing ripple current in a power supply device including a multi-phase converter having a magnetic-coupling-type reactor.

Solution to Problem

A power supply device according to the present invention includes: a multi-phase converter including a plurality of chopper circuits connected in parallel between a power supply line connected to a load and a DC power supply; and a control circuit controlling operation of the plurality of chopper circuits. The plurality of chopper circuits each include at least one switching element and a reactor disposed to pass electric current in response to operation of the switching element. In a case of a low-temperature state in which a temperature of the power supply is lower than a predetermined value, the control circuit controls the operation of the plurality of chopper circuits so that a difference in electric current value between the reactors is larger relative to a case of a non-low-temperature state in which the temperature of the power supply is higher than the predetermined value, to thereby increase a ripple component of current flowing in the power supply.

Preferably, the plurality of chopper circuits include at least a first chopper circuit adjusting current flowing in a first reactor and a second chopper circuit adjusting current flowing in a second reactor. The first reactor and the second reactor are arranged to be magnetically coupled to each other. In a case of the low-temperature state, the control circuit controls the first chopper circuit and the second chopper circuit so that a difference between a value of current flowing in the first reactor and a value of current flowing in the second reactor is increased relative to a case of the non-low-temperature state.

Preferably, the power supply device further includes: a first sensor detecting a value of current flowing in the first reactor; and a second sensor detecting a value of current flowing in the second reactor. The control circuit includes: a setting unit setting a voltage command value for the power supply line based on an operating state of the load; and a control unit controlling the first chopper circuit in accordance with a result of a first calculation performed based on the voltage command value and the value detected by the first sensor and controlling the second chopper circuit in accordance with a result of a second calculation performed based on the voltage command value and the value detected by the second sensor. In a case of the low-temperature state, the control unit performs an offset process of adding a predetermined amount to the value detected by one of the first sensor and the second sensor to thereby increase a difference between the value of current flowing in the first reactor and the value of current flowing in the second reactor.

Preferably, the control unit changes the predetermined amount depending on the temperature of the power supply.

Preferably, each time a predetermined condition is satisfied, the control unit switches a detected value to be subjected to the offset process, between the value detected by the first sensor and the value detected by the second sensor.

Preferably, in a case of the low-temperature state, the control circuit performs a stoppage process of stopping operation of one of the first chopper circuit and the second chopper circuit.

Preferably, each time a predetermined condition is satisfied, the control circuit switches a chopper circuit to be subjected to the stoppage process, between the first chopper circuit and the second chopper circuit.

Preferably, the chopper circuits each include a first switching element and a second switching element connected in series between a ground line and the power supply line. The reactor has a coil winding connected between the power supply and a point of connection of the first and second switching elements, and respective coil windings of the chopper circuits are wound around different portions of a common core.

Advantageous Effects of Invention

In accordance with the present invention, in the case where the temperature of the DC power supply is low in the power supply device including the multi-phase converter having the magnetic-coupling-type reactor, the temperature of the DC power supply can be raised by increasing ripple current.

DESCRIPTION OF EMBODIMENTS

Embodiments of the present invention will hereinafter be described in detail with reference to the drawings. In the following, the same or corresponding components in the drawings are denoted by the same reference characters, and a description thereof will not be repeated in principle.

First Embodiment

Figure 1:
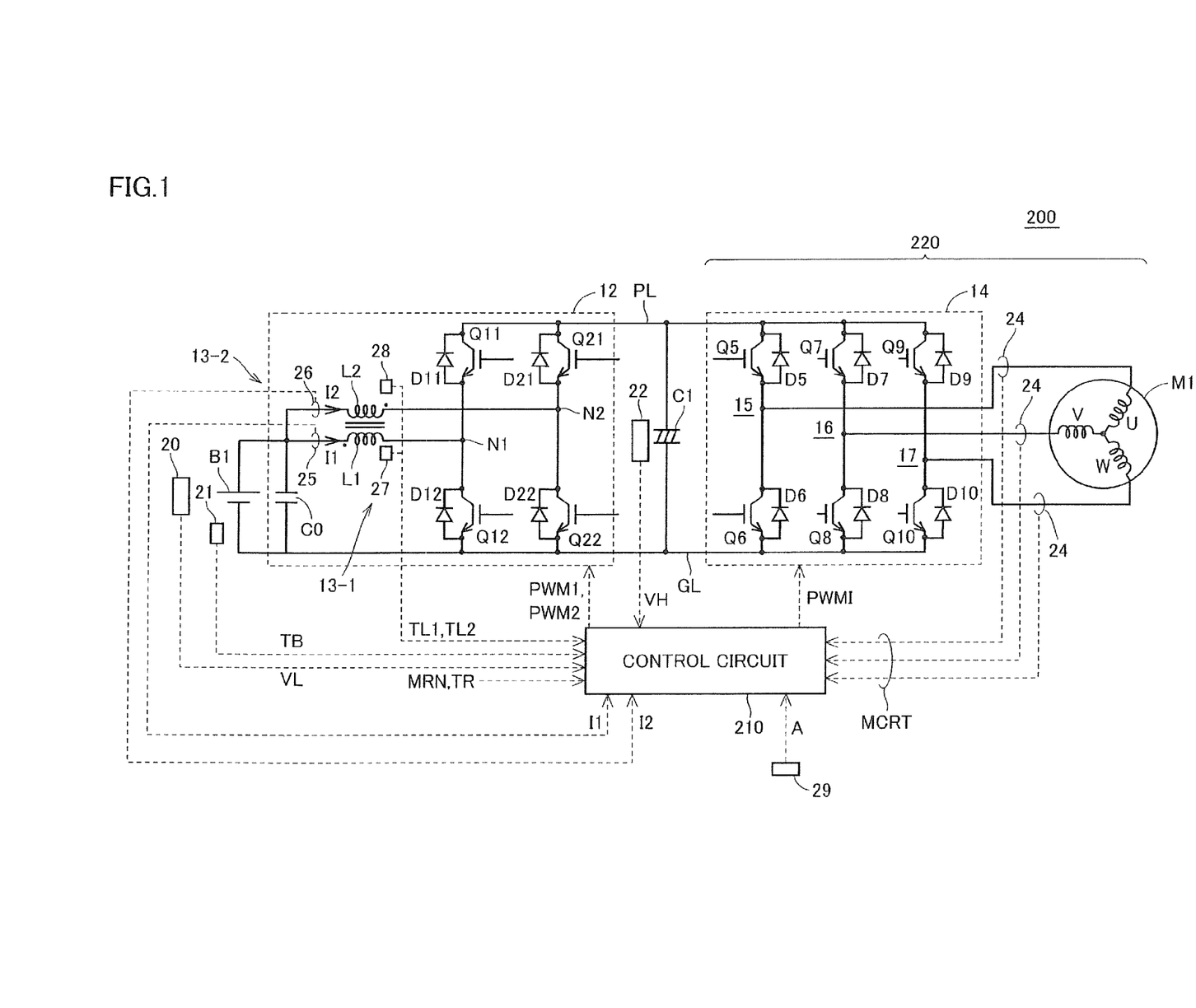
FIG. 1 is a circuit diagram showing a configuration of a motor drive including a power supply device according to an embodiment of the present invention.

FIG. 1 is a circuit diagram showing a configuration of a motor drive 200 including a power supply device according to an embodiment of the present invention.

Referring to FIG. 1, motor drive 200 includes a DC power supply B1, a magnetic-coupling-type multi-phase converter 12, a smoothing capacitor C1, a control circuit 210, and a load 220. Multi-phase converter 12 and control circuit 210 constitute the power supply device according to the embodiment of the present invention.

DC power supply B1 outputs a DC voltage. DC power supply B1 is typically formed of a secondary battery such as nickel-metal hydride or lithium-ion secondary battery. In the case where a temperature TB of DC power supply B1 is very low, the dischargeable electric power and the chargeable electric power of DC power supply B1 have very small values (approximately a few kilowatt for example).

Multi-phase converter 12 includes a smoothing capacitor C0 and parallel-connected chopper circuits 13-1 and 13-2. Chopper circuit 13-1 includes semiconductor switching elements for electric power (hereinafter simply referred to as "switching elements") Q11 and Q12, diodes D11 and D12, and a reactor L1. Switching elements Q11 and Q12 are connected in series between a power supply line PL and a ground line GL. Reactor L1 is electrically connected between a node N1, which is a connection node of switching elements Q11 and Q12, and DC power supply B1. Diodes D11 and D12 are connected in anti-parallel with switching elements Q11 and Q12, respectively. Smoothing capacitor C0 smoothes a DC voltage on the low-voltage side of multi-phase converter 12, which is the output voltage of DC power supply B1.

Chopper circuit 13-2 is configured similarly to chopper circuit 13-1, and includes switching elements Q21 and Q22, diodes D21 and D22, and a reactor L2. Reactor L2 is electrically connected between a node N2, which is a connection node of switching elements Q21 and Q22, and DC power supply B1.

In multi-phase converter 12, reactors L1 and L2 are arranged so that they are magnetically coupled to each other. Namely, reactors L1 and L2 are provided to constitute a magnetic-coupling-type reactor.

Figure 2:
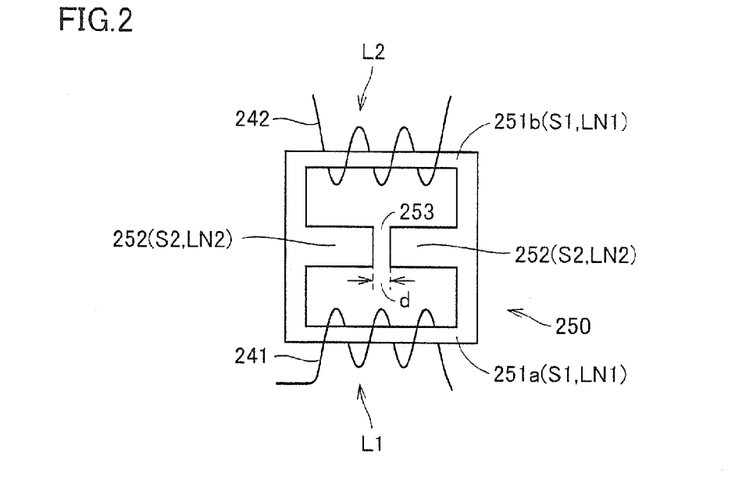
FIG. 2 is a circuit diagram showing an exemplary configuration of a magnetic-coupling-type reactor.

FIG. 2 shows an exemplary configuration of the magnetic-coupling-type reactor.

Referring to FIG. 2, the magnetic-coupling-type reactor includes a core 250 and coil windings 241, 242 wound on core 250. Core 250 includes outer legs 251a, 251b, and central legs 252 arranged to face each other with a gap 253 therebetween.

Coil winding 241 which is a constituent of reactor L1 is wound around outer leg 251a. Coil winding 242 which is a constituent of reactor L2 is wound around outer leg 251b. Here, a magnetic resistance R1 of outer legs 251a, 251b is expressed by a formula (1) below where S1 represents the cross-sectional area of outer legs 251a and 251b and LN1 represents the length thereof. Likewise, a magnetic resistance R2 of central legs 252 is expressed by a formula (2) below where S2 represents the cross-sectional area of central legs 252, LN2 represents the length thereof, and d represents the length of the gap. In formulas (1) and (2), $\mu$ represents the magnetic permeability of core 250 and $\mu 0$ represents the magnetic permeability of the air in the gap.

$$R1 \approx (1/\mu) \cdot (LN1/S1) \quad (1)$$

$$R2 \approx (1/\mu) \cdot 2 \cdot (LN2/S2) + 1/\mu 0 \cdot (d/S2) \quad (2)$$

In the present embodiment, constants S1, LN1, S2, LN2, and d of the magnetic-coupling-type reactor are set, so that R1 and R2 provided by formulas (1) and (2) satisfy R2>>R1.

By this setting, most of a magnetic flux generated by electric current passing through coil winding 241 is interlinked with coil winding 242, and most of a magnetic flux generated by electric current passing through coil winding 242 is interlinked with coil winding 241. Consequently, in FIG. 1, counter electromotive forces in the opposite direction to respective electromotive forces generated in reactors L1 and L2 are generated in reactors L2 and L1 respectively.

It is noted that the shape of core 250 is not limited to the example in FIG. 2, and may be any as long as the equivalent circuit shown in FIG. 1 can be configured. For example, outer legs 251a, 251b may also have a gap therein. Further, while the number of phases of multi-phase converter 12 is two in the present embodiment, the number of phases may be three or more.

Referring again to FIG. 1, smoothing capacitor C1 is connected between power supply line PL and ground line GL. Load 220 includes an inverter 14 connected to power supply line PL and ground line GL, and an AC (alternating current) motor M1 connected to inverter 14.

Inverter 14 performs bidirectional electric-power conversion between DC power on power supply line PL and AC power which is input/output to/from AC motor M1. AC motor M1 is driven by the AC power which is input/output to/from inverter 14 to generate a positive or negative torque.

Inverter 14 is made up of a U phase arm 15, a V phase arm 16, and a W phase arm 17. U phase arm 15, V phase arm 16, and W phase arm 17 are disposed in parallel between power supply line PL and ground line GL. U phase arm 15 is constituted of switching elements Q5, Q6, V phase arm 16 is constituted of switching elements Q7, Q8, and W phase arm 17 is constituted of switching elements Q9, Q10. Diodes D5 to D10 are connected in anti-parallel with switching elements Q5 to Q10, respectively. Respective intermediate nodes of U phase arm 15, V phase arm 16, and W phase arm 17 are connected to respective ends of stator windings of the U phase, the V phase, and the W phase of AC motor M1. Respective other ends of these stator windings are connected at a neutral point.

AC motor M1 is formed for example of a permanent-magnet-type synchronous motor operating as a motor generator. AC motor M1 is a drive motor for generating a drive torque for drive wheels of an electrically-powered vehicle such as hybrid vehicle, electric vehicle, or fuel cell vehicle. Namely, motor drive 200 is typically mounted on an electrically-powered vehicle. AC motor M1 regeneratively generates electric power from a rotational force of drive wheels when the electrically-powered vehicle is regeneratively braked.

Alternatively, this AC motor M1 may be incorporated in a hybrid vehicle so that AC motor M1 has the function of an electric generator driven by an engine and also operates as an electric motor adapted to the engine and capable for example of starting the engine.

A voltage sensor 20 detects a DC voltage VL on the low-voltage side of multi-phase converter 12 that corresponds to the output voltage of DC power supply B1. A voltage sensor 22 detects a voltage of power supply line PL, namely a DC voltage VH on the high-voltage side of multi-phase converter 12.

A current sensor 24 detects a motor current MCRT of each phase that flows between inverter 14 and AC motor M1. It is noted that the sum of respective instantaneous values of the phase currents of the three phases is always zero, and therefore, current sensors 24 may be disposed for any two phases of the three phases and the motor current of the remaining phase for which current sensor 24 is not disposed may be determined by calculation. A current sensor 25 detects a reactor current I1 passing through reactor L1, and a current sensor 26 detects a reactor current I2 passing through reactor L2. Respective values VL, VH detected by voltage sensors 20, 22, respective values I1, I2 detected by current sensors 25, 26, and value MCRT detected by current sensor 24 are input to control circuit 210.

Further, to control circuit 210, respective signals from temperature sensors 21, 27, 28 and an accelerator pedal position sensor 29 are input.

Temperature sensor 21 detects temperature TB of DC power supply B1. Temperature sensor 27 detects temperature TL1 of reactor L1. Temperature sensor 28 detects temperature TL2 of reactor L2. The results of detection by temperature sensors 21, 27, 28 are input to control circuit 210.

Accelerator pedal position sensor 29 detects the extent to which the accelerator pedal is depressed by a user, and transmits the result of detection as an accelerator signal A to control circuit 210.

Control circuit 210 is constituted of a CPU (Central Processing Unit) and an electronic control unit (ECU) (they are not shown) in which a memory is contained, and configured to execute predetermined operational processing based on a map and a program stored in the memory. Alternatively, at least a part of the ECU may be configured to execute predetermined numerical/logical operational processing by means of hardware such as electronic circuit.

Based on the signals that are input from the above-described sensors respectively as well as a rotational speed MRN of AC motor M1 and a torque command value TR for AC motor M1, control circuit 210 controls ON and OFF (switching) of switching elements Q11, Q12, Q21, Q22, and Q5 to Q10 of multi-phase converter 12 and inverter 14, so that AC motor M1 operates in accordance with an operation command. Specifically, in order to control the voltage of power supply line PL so that the voltage reaches a desired voltage, control circuit 210 generates signals PWM1, PWM2 for controlling ON and OFF of switching elements Q11, Q12, Q21, Q22. Further, in order to control the output torque of AC motor M1 in accordance with torque command value TR, control circuit 210 generates a signal PWMI for controlling ON and OFF of switching elements Q5 to Q10, so that the amplitude and/or the phase of a pseudo AC voltage applied to AC motor M1 are/is controlled.

Chopper circuits 13-1, 13-2 respectively render switching elements Q12, Q22 of the lower arm ON or OFF to allow the switched current to pass through reactors L1, L2, and accordingly use the current path provided by diodes D11, D21 of the upper arm, so that DC voltage VH can be generated on power supply line PL by stepping up DC voltage VL on the low-voltage side (power running mode, I1>0, I2>0).

On the contrary, chopper circuits 13-1, 13-2 respectively render switching elements Q11, Q21 of the upper arm ON or OFF to allow the switched current to pass through reactors L1, L2, and accordingly use the current path provided by diodes D12, D22 of the lower arm, so that DC power supply B1 is charged with DC voltage VL generated by stepping down DC voltage VH on the high-voltage side (regenerative mode, I1<0, I2<0).

In chopper circuits 13-1, 13-2, switching elements Q11, Q21 of the upper arm may be fixed in the OFF state in the power running mode, and switching elements Q12, Q22 of the lower arm may be fixed in the OFF state in the regenerative mode. It should be noted here that, for continuous adaptation to the regenerative mode and the power running mode without changing control depending on the direction in which the current flows, switching elements Q11, Q21 of the upper arm and switching elements Q12, Q22 of the lower arm may complementarily be rendered ON or OFF in each switching period.

In the present embodiment, the ratio of an ON period of the switching elements of the lower arm to the switching period will hereinafter be defined as a duty ratio DT. Namely, the ratio of an ON period of the upper arm is expressed as (1.0-DT). Based on general characteristics of the chopper circuits, the relation between this duty ratio DT and the voltage conversion in chopper circuits 13-1, 13-2 each is expressed by a formula (3) below. Formula (3) is changed to express voltage VH on the high-voltage side by formula (4).

$$DT=1.0-(VL/VH) \quad (3)$$

$$VH=VL/(1.0-DT) \quad (4)$$

From formulas (3) and (4), it is understood that VH=VL is met when switching elements Q12, Q22 of the lower arm are fixed in the OFF state (DT=0.0), and voltage VH increases with an increase of duty ratio DT. Namely, control circuit 210 can control voltage VH of power supply line PL by controlling duty ratio DT in chopper circuits 13-1, 13-2. Particulars of such converter control will be described in detail later herein.

Two chopper circuits 13-1, 13-2 constituting multi-phase converter 12 operate with respective phases shifted by 180 (360/2) degrees, namely a half period relative to the switching period. Accordingly, respective phases of signals PWM1 and PWM2 are shifted from each other by 180 degrees.

Further, in multi-phase converter 12, the magnetic-coupling-type reactor acts so that respective ripple components of reactor currents I1, I2 cancel each other out between circuit 13-1 and circuit 13-2. Therefore, the characteristic of the ripple current with respect to the duty ratio in multi-phase converter 12 of FIG. 1 differs from that of normal chopper circuits.

Figure 3:
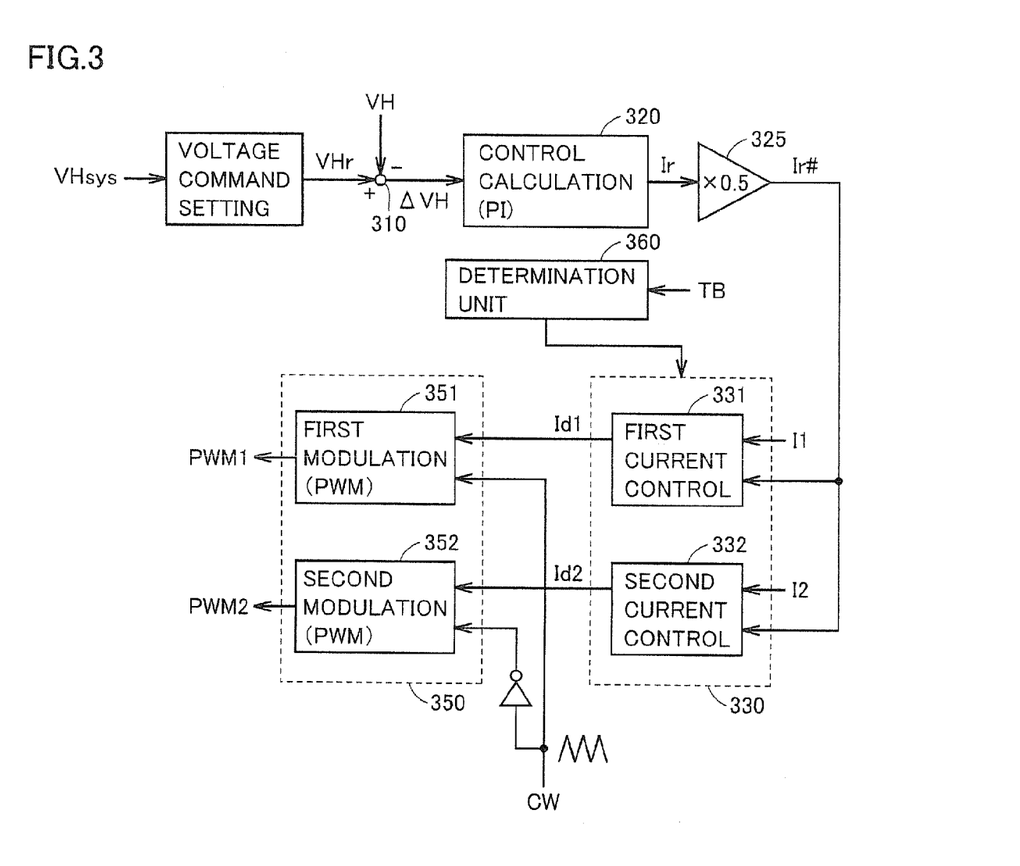
FIG. 3 is a functional block diagram illustrating a control configuration for a multi-phase converter.

FIG. 3 is a functional block diagram illustrating a control configuration for multi-phase converter 12 in the power supply device according to the embodiment of the present invention. Respective functions of the blocks shown in FIG. 3 may be implemented through software processing by control circuit 210, or may be implemented by configuring an electronic circuit (hardware) implementing the functions as control circuit 210.

Referring to FIG. 3, control circuit 210 shown in FIG. 1 includes a voltage command setting unit 300, a subtraction unit 310, a control calculation unit 320, a multiplication unit 325, a current control unit 330, a modulation unit 350, and a determination unit 360.

Voltage command setting unit 300 sets a voltage command value VHr in accordance with a voltage request value VHsys. Voltage request value VHsys is a value requested for voltage VH of power supply line PL, and is provided for example from an external ECU (not shown). Voltage request value VHsys is variably set, depending on an operating state of load 220 (such as rotational speed MRN and torque command value TR of AC motor M1) and a user's request (such as accelerator signal A). Voltage command value VHr is a target control value for voltage VH of power supply line PL.

Subtraction unit 310 subtracts, from voltage command value VHr which has been set by voltage command setting unit 300, voltage VH detected by voltage sensor 22 to thereby calculate a voltage difference $\Delta$VH. Control calculation unit 320 typically follows PI control (proportional integral) calculation to set a current command value Ir so that voltage difference $\Delta$VH approaches zero. In qualitative respect, as $\Delta$VH increases (changes in the positive direction), current command value Ir increases and, as $\Delta$VH decreases (changes in the negative direction), current command value Ir decreases.

Multiplication unit 325 multiplies current command value Ir for the whole multi-phase converter 12 by 0.5 to thereby calculate a current command value Ir# for chopper circuits 13-1, 13-2 each (Ir#=Ir/2).

Current control unit 330 includes a first current control unit 331 and a second current control unit 332.

First current control unit 331 sets a duty command value Id1 in accordance with control calculation (such as PI control calculation) based on a current difference between the value of reactor current I1 detected by current sensor 25 and current command value Ir#.

Second current control unit 332 sets a duty command value Id2 in accordance with control calculation (such as PI control calculation), which is similar to that of first current control unit 331, based on a current difference between the value of reactor current I2 detected by current sensor 26 and current command value Ir#.

Duty command values Id1, Id2 are set in a range where $0.0 \leq$ Id1, Id2 $< 1.0$. When reactor currents I1, I2 are to be increased in accordance with current command value Ir#, first current control unit 331 and second current control unit 332 increase the duty ratio. On the contrary, when reactor currents I1, I2 are to be decreased, first current control unit 331 and second current control unit 332 set duty command values Id1, Id2 so that the duty ratio decreases.

Modulation unit 350 includes a first modulation unit 351 and a second modulation unit 352. First modulation unit 351 generates signal PWM1 for controlling chopper circuit 13-1, in accordance with a voltage comparison between a carrier wave CW which is a triangular wave or sawtooth wave of a predetermined frequency and duty command value Id1. The frequency of carrier wave CW corresponds to the switching frequency of chopper circuits 13-1, 13-2. The peak voltage of carrier wave CW corresponds to the range from 0 to 1.0 of the duty ratio indicated by duty command value Id1. First modulation unit 351 generates signal PWM1 so that switching element Q12 of the lower arm is rendered ON in a period in which Id1>CW holds, and switching element Q12 of the lower arm is rendered OFF in a period in which CW>Id1 holds.

As seen from the foregoing, when voltage VH is lower than voltage command value VHr, chopper circuit 13-1 is pulse-width-modulation (PWM)-controlled in such a manner that duty command value Id1 is set to increase the duty ratio of the lower arm and thereby increase reactor current I1. On the contrary, when voltage VH is higher than voltage command value VHr, chopper circuit 13-1 is pulse-width-modulation (PWM)-controlled in such a manner that duty command value Id1 is set to decrease the duty ratio of the lower arm and thereby decrease reactor current I1.

Second modulation unit 352 has a similar function to first modulation unit 351, and generates signal PWM2 for controlling chopper circuit 13-2, in accordance with a voltage comparison between an inverted signal of the above-described carrier wave CW, namely a signal with its phase shifted by 180 degrees relative to carrier wave CW, and duty command value Id2. Accordingly, chopper circuits 13-1, 13-2 are controlled independently of each other by switching control (duty ratio control) for controlling voltage VH so that voltage VH meets voltage command value VHr, under the condition that respective phases of switching control are shifted by 180 degrees. As described above, in an OFF period of switching elements Q12, Q22 of the lower arm, switching elements Q11, Q21 of the upper arm may be rendered ON.

Thus, in accordance with the control configuration shown in FIG. 3, two parallel-connected chopper circuits 13-1 and 13-2 in multi-phase converter 12 operate with respective phases shifted by an electrical angle of 180°, and chopper circuits 13-1, 13-2 are controlled independently of each other by control of reactor currents I1, I2 for controlling voltage VH so that voltage VH meets voltage command VHr.

The above-described control is the control performed in a normal case. Under such normal-case control, actual reactor current I1 and reactor current I2 have respective magnitudes that are almost equal to each other. Thus, reactor current I1 and reactor current I2 are kept balanced, and accordingly ripple components of reactor currents I1 and I2 are reduced and the ripple component of the current flowing in DC power supply B1 is also reduced. Usually, internal resistance is present in DC power supply B1. As current is flown in DC power supply B1, Joule heat depending on the magnitude of the ripple component is generated in DC power supply B1. Therefore, reactor currents I1, I2 are kept balanced to reduce the ripple components. Accordingly, the quantity of heat generated in DC power supply B1 can be decreased and an energy loss can be reduced.

In the case, however, where temperature TB of DC power supply B1 is very low, the dischargeable electric power and the chargeable electric power of DC power supply B1 have very small values as described above. In this case, sufficient electric power cannot be supplied to AC motor M1, and DC power supply B1 cannot be sufficiently charged with the regenerative electric power generated by AC motor M1.

Thus, in the case where temperature TB of DC power supply B1 is lower than a reference temperature T0, the power supply device of the present embodiment controls chopper circuits 13-1, 13-2 to intentionally destroy the balance between reactor currents I1 and I2 instead of keeping the balance between reactor currents I1 and I2 as described above. It is noted that "to destroy the balance between reactor currents I1 and I2" means increasing a difference between the magnitude (average value) of reactor current I1 and the magnitude (average value) of reactor current I2. This feature that control is executed to intentionally destroy the balance between reactor currents I1 and I2 in the case where temperature TB of DC power supply B1 is low is a most characteristic feature of the power supply device in the present embodiment.

This feature will more specifically be described. Control circuit 210 further includes determination unit 360. Determination unit 360 determines whether or not temperature TB is lower than reference temperature T0, and outputs the result of determination to current control unit 330.

In the case where temperature TB is higher than reference temperature T0, current control unit 330 sets duty command values Id1 and Id2 to intentionally destroy the balance between reactor currents I1 and I2. In the following, a description will be given of an example of the way to destroy the balance, by which the value of reactor current I1 detected by current sensor 25 is offset, namely displaced. It is noted that the way to destroy the balance is not limited to this. Other examples will be described in connection with second to fourth embodiments.

In the case where temperature TB is higher than reference temperature T0, current control unit 330 performs the normal-case control in the above-described manner. Namely, first current control unit 331 directly uses the value of reactor current I1 detected by current sensor 25 to perform the PI control calculation and set duty command value Id1. Likewise, second current control unit 332 directly uses the value of reactor current I2 detected by current sensor 26 to perform the PI control calculation and set duty command value Id2. Accordingly, respective magnitudes of reactor currents I1 and I2 are kept almost equal to each other, and therefore, the ripple components included in reactor currents I1 and I2 are reduced.

In contrast, in the case where temperature TB is lower than reference temperature T0, current control unit 330 offsets only the value of reactor current I1 detected by current sensor 25. Namely, first current control unit 330 uses a value determined by adding an offset amount α (>0) to the value of reactor current I1 detected by current sensor 25 to perform the PI control calculation and set duty command value Id1. At this time, offset amount α is set to a larger value as temperature TB is lower. It is noted that offset amount α may be a fixed value. As for second current control unit 332, it directly uses the value of reactor current I2 detected by current sensor 26 to perform the PI control calculation and set duty command value Id2. Accordingly, the balance between reactor currents I1 and I2 is destroyed and the ripple component of reactor current I2 which has not been offset is increased. As a result, the ripple component of the current flowing in DC power supply B1 is also increased and the quantity of heat generated in DC power supply B1 is increased. Therefore, temperature TB of DC power supply B1 is raised.

Figure 4:
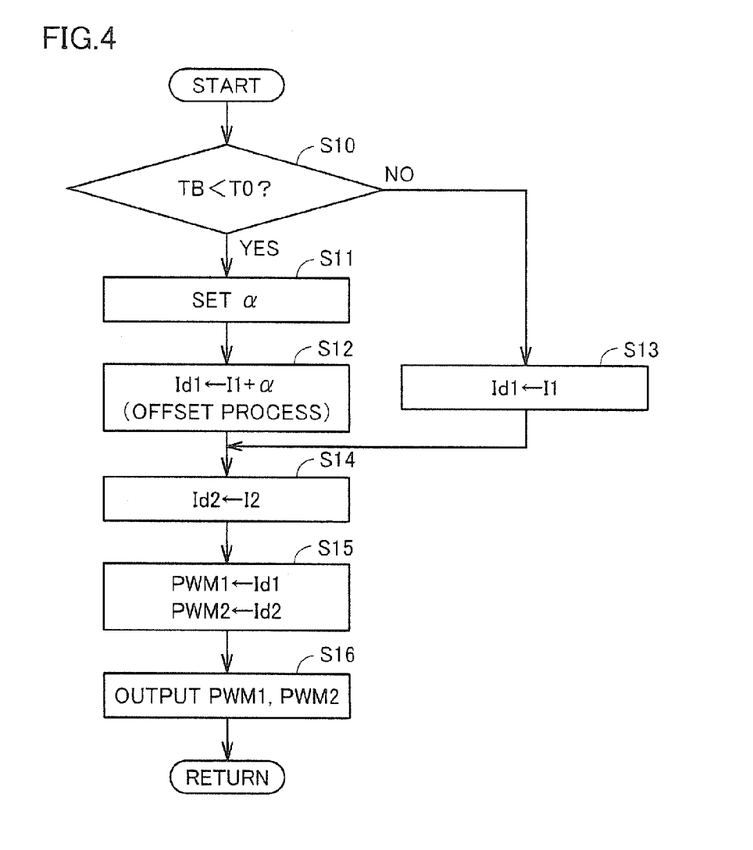
FIG. 4 is a (first) flowchart showing a process procedure of a control circuit.

FIG. 4 is a flowchart showing a process procedure performed by control circuit 210 for implementing the above-described functions. While each step (hereinafter step is abbreviated as "S") in the flowchart described below is basically implemented by software processing by control circuit 210, it may be implemented by hardware processing by an electronic circuit or the like provided in control circuit 210.

In S10, control circuit 210 determines whether or not temperature TB is lower than reference temperature T0. This process corresponds to the function of determination unit 360 in FIG. 3.

In the case where temperature TB is lower than reference temperature T0 (YES in S10), control circuit 210 proceeds to the process in S11 to set offset amount α (>0). It is noted that offset amount α is set to a larger value as temperature TB is lower as described above. In the subsequent S12, control circuit 210 uses a value determined by adding offset amount α to the value of reactor current I1 detected by current sensor 25 to perform the PI control calculation and set duty command value Id1. This process of offsetting the value detected by the current sensor will hereinafter be referred to as "offset process."

In contrast, in the case where temperature TB is higher than reference temperature T0 (NO in S10), control circuit 210 proceeds to the process in S13 and directly uses the value of reactor current I1 detected by current sensor 25 to perform the PI control calculation and set duty command value Id1. Namely, in the case where temperature TB is higher than reference temperature T0, control circuit 210 does not perform the offset process and carries out the normal-case control.

In S14, control circuit 210 directly uses the value of reactor current I2 detected by current sensor 26 to perform the PI control calculation and set duty command value Id2. The processes of S11 to S14 correspond to the function of current control unit 330 in FIG. 3.

In S15, control circuit 210 generates signal PWM1 based on duty command value Id1 and generates signal PWM2 based on duty command value Id2. In S16, signals PWM1 and PWM2 are output to multi-phase converter 12. The processes of S15 and S16 correspond to the function of modulation unit 350 in FIG. 3.

Figure 5:
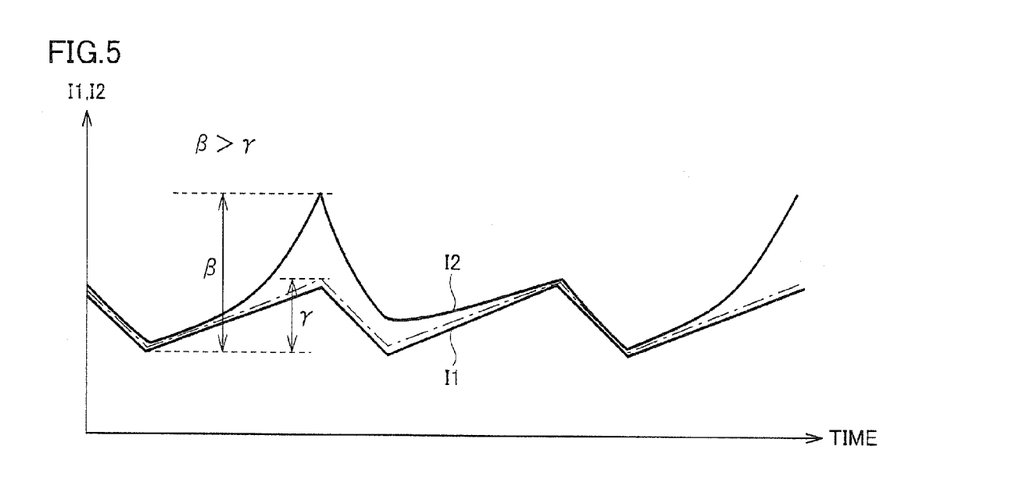
FIG. 5 is a diagram showing reactor current waveforms obtained as a result of a process by the control circuit.

FIG. 5 shows respective waveforms of reactor currents I1 and I2 obtained as a result that control circuit 210 performs the offset process. It is noted that the alternate long and short dash line in FIG. 4 represents, for the sake of comparison, a waveform of reactor current I2 in the case where the offset process is not performed.

The offset process performed on the detected value of reactor current I1 causes the balance between reactor currents I1 and I2 to be destroyed. Accordingly, the ripple component of reactor current I2 increases. Namely, as shown in FIG. 5, a ripple width β of reactor current I2 in the case where the offset process is performed is larger than a ripple width γ of reactor current I2 in the case where the offset process is not performed. Therefore, in the case where temperature TB is lower than reference temperature T0, the ripple component of the current (sum of reactor currents I1 and I2) flowing in DC power supply B1 increases by the difference between ripple width β and ripple width γ, relative to the case where temperature TB is higher than reference temperature T0. Accordingly, the quantity of heat generated in DC power supply B1 increases, which raises temperature TB of DC power supply B1.

As seen from the foregoing, in the case where temperature TB of DC power supply B1 is lower than reference temperature T0, control circuit 210 according to the present embodiment performs the offset process on the detected value of reactor current I1 to intentionally destroy the balance between respective magnitudes of reactor currents I1 and I2. Accordingly, the ripple component of the current flowing in DC power supply B1 is increased to immediately raise temperature TB of DC power supply B1 and thereby enable the input/output characteristics of DC power supply B1 to be improved.

Second Embodiment

In the above-described first embodiment, the offset process is performed on only the detected value of reactor current I1

In contrast, a second embodiment switches the value to be subjected to the offset process between the detected value of reactor current I1 and the detected value of reactor current I2, each time a predetermined condition is satisfied. This is a feature of the second embodiment. Since other structural characteristics, functions, and processes are similar to those of the above-described first embodiment, the detailed description thereof will not be repeated here.

Figure 6:
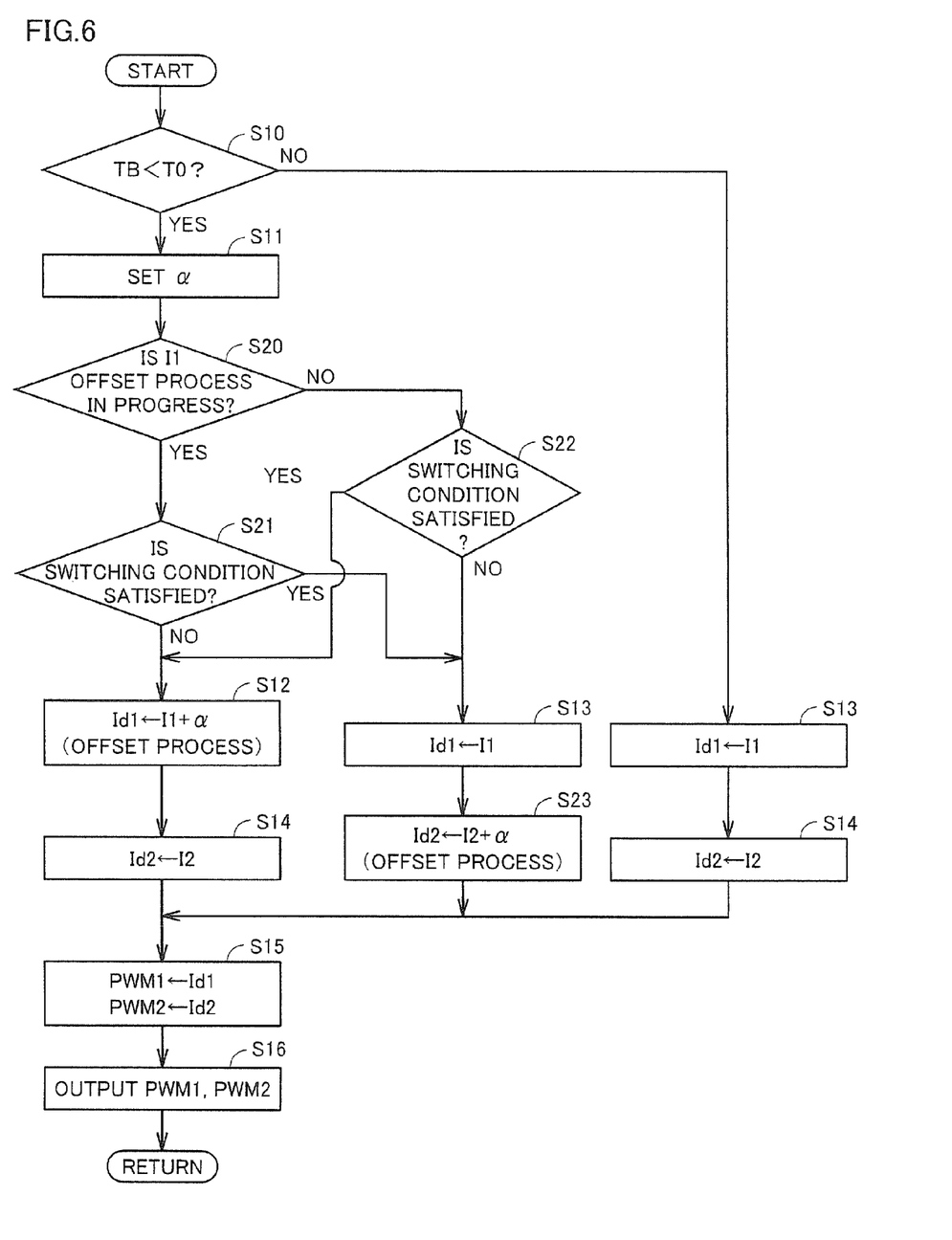
FIG. 6 is a (second) flowchart showing a process procedure of the control circuit.

FIG. 6 is a flowchart showing a process procedure performed by control circuit 210 according to the second embodiment. It is noted that any process in the flowchart shown in FIG. 6 that is identical to a corresponding process in the above-described flowchart shown in FIG. 4 is denoted by the same step number as that in FIG. 4. Details of these processes are also identical to each other. Therefore, the detailed description thereof will not be repeated here in principle.

In the case where temperature TB is lower than reference temperature T0 (YES in S10), control circuit 210 sets offset amount α in S11.

After this, in S20, control circuit 210 determines whether or not the offset process on reactor current I1 is in progress.

In the case where the offset process on reactor current I1 is in progress (YES in S20), control circuit 210 determines in S21 whether or not a predetermined switching condition is satisfied. The switching condition is preferably set in consideration of the fact that the offset process on reactor current I1 increases the load on reactor L2 (the fact that the ripple component of reactor current I2 increases to cause the temperature of reactor L2 to rise). For example, the condition that temperature TL2 of reactor L2 exceeds an upper limit may be used as a switching condition. The condition that the time for which the offset process on the detected value of reactor current I1 is continued exceeds a predetermined time may also be used as a switching condition.

In the case where the switching condition is not satisfied (NO in S21), control circuit 210 still performs the offset process on the detected value of reactor current I1 (S12, S14, S15, S16). In contrast, in the case where the switching condition is satisfied (YES in S21), control circuit 210 switches the value to be subjected to the offset process from the detected value of reactor current I1 to the detected value of reactor current I2. Specifically, in S13, control circuit 210 directly uses the detected value of reactor current I1 to perform the PI control calculation and set duty command value Id1. In the subsequent S23, control circuit 210 uses a value which is determined by adding offset amount α to the detected value of reactor current I2 to perform the PI control calculation and set duty command value Id2.

Likewise, in the case where the offset process on reactor current I2 is in progress (NO in S20), control circuit 210 determines in S22 whether or not a predetermined switching condition is satisfied. The switching condition may be set based on a similar concept to the concept described above in connection with the process in S21.

In the case where the switching condition is not satisfied (NO in S22), control circuit 210 still performs the offset process on the detected value of reactor current I2 (S13, S23, S15, S16). In contrast, in the case where the switching condition is satisfied (YES in S22), control circuit 210 switches the value to be subjected to the offset process from the detected value of reactor current I2 to the detected value of reactor current I1 (S12, S14, S15, S16).

Thus, in the second embodiment, each time the switching condition is met, the value to be subjected to the offset process is switched between the detected value of reactor current I1 and detected value of reactor current I2. Accordingly, even when the offset process is continued for a relatively long period of time, the load can be prevented from being exerted excessively on one of the reactors and the controllability of multi-phase converter 12 can be prevented from being deteriorated.

Third Embodiment

In the above-described first embodiment, the method that offsets the detected value of reactor current I1 is used as a method for destroying the balance between reactor currents I1 and I2.

In contrast, a third embodiment uses a method that stops switching of one of the two chopper circuits 13-1 and 13-2, as a method for destroying the balance between reactor currents I1 and I2. This is a feature of the third embodiment. Since other structural characteristics, functions, and processes are similar to those of the above-described first embodiment, the detailed description thereof will not be repeated here.

Figure 7:
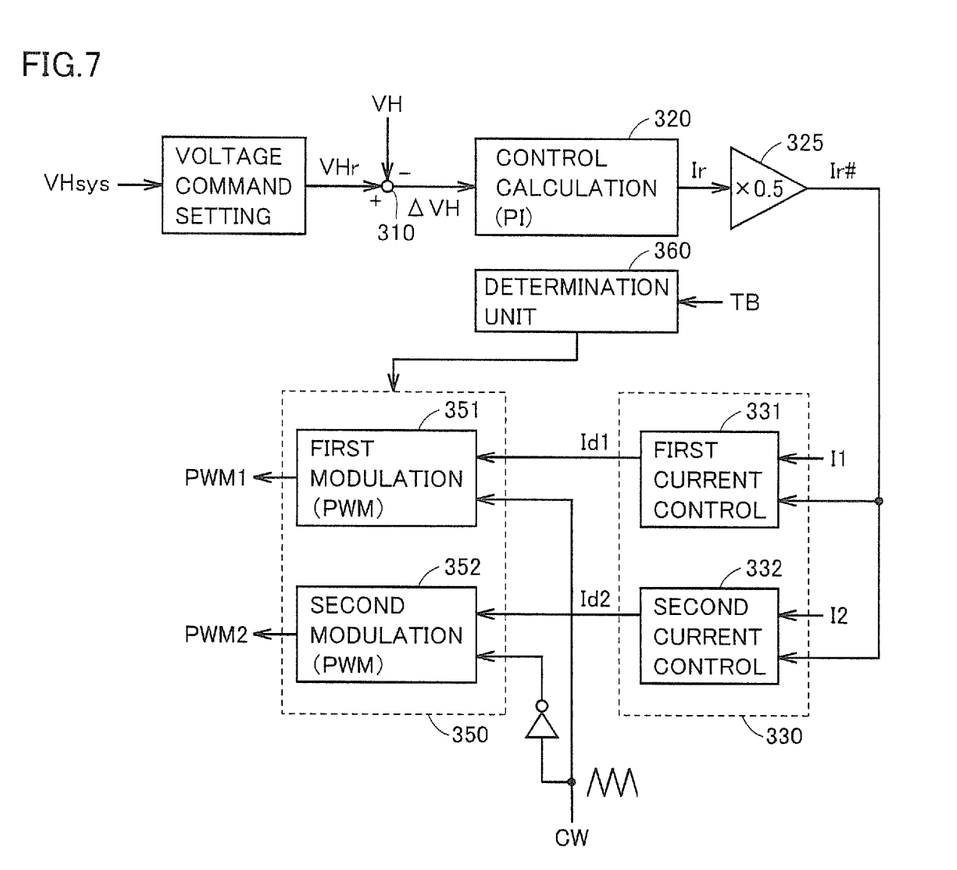
FIG. 7 is a functional block diagram illustrating a control configuration for a multi-phase converter.

FIG. 7 shows a functional block diagram of control circuit 210 according to the third embodiment. Control circuit 210 according to the third embodiment and control circuit 210 according to the first embodiment differ from each other chiefly in the following two respects. First, determination unit 360 outputs the result of its determination to modulation unit 350 rather than current control unit 330. Second, in the case where temperature TB is lower than reference temperature T0, modulation unit 350 performs a process of stopping output of one of signals PWM1 and PWM2 (this process will also be referred to as "single switching-off process" hereinafter), instead of the offset process performed by current control unit 330. Since other functions are identical to those of the above-described first embodiment, the detailed description thereof will not be repeated here.

Figure 8:
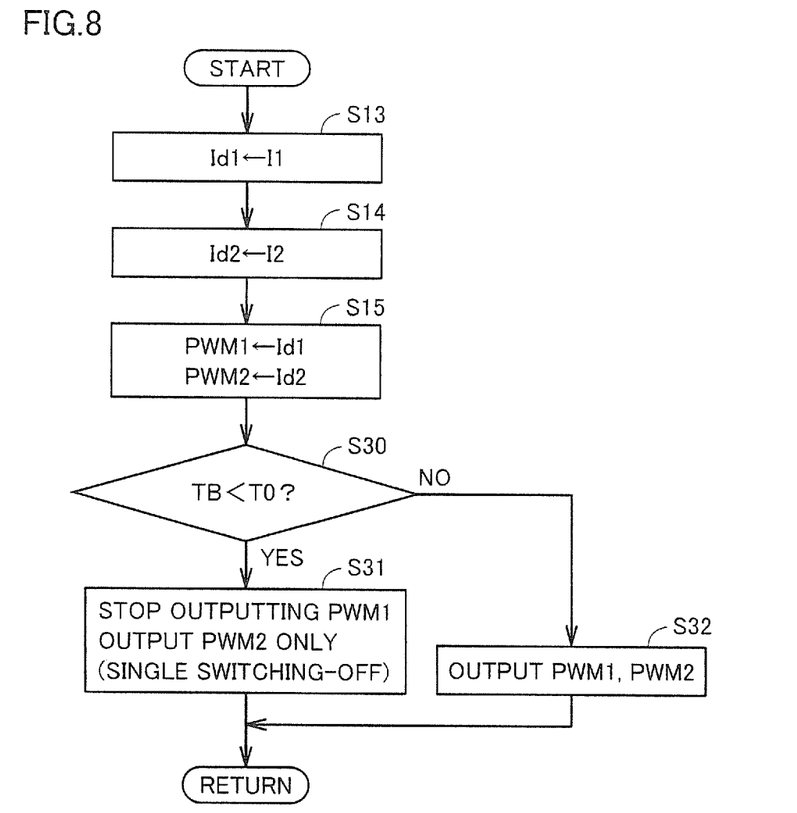
FIG. 8 is a (third) flowchart showing a process procedure of the control circuit.

FIG. 8 is a flowchart showing a process procedure performed by control circuit 210 according to the third embodiment. It is noted that any process in the flowchart shown in FIG. 8 that is identical to a corresponding process in the above-described flowchart shown in FIG. 4 is denoted by the same step number as that in FIG. 4. Details of these processes are also identical to each other. Therefore, the detailed description thereof will not be repeated here.

In S30, control circuit 210 determines whether or not temperature TB is lower than reference temperature T0.

In the case where temperature TB is higher than reference temperature T0 (NO in S30), control circuit 210 proceeds to the process in S32 and performs the normal-case control. Namely, control circuit 210 outputs both signal PWM1 and signal PWM2 to multi-phase converter 12.

In contrast, in the case where temperature TB is lower than reference temperature T0 (YES in S30), control circuit 210 proceeds to the process in S31 to stop outputting signal PWM1 and output only the signal PWM2 to multi-phase converter 12. Accordingly, chopper circuit 13-1 is stopped and only chopper circuit 13-2 is operated. This process is the single switching-off process.

As seen from the foregoing, in the case where temperature TB of DC power supply B1 is lower than reference temperature T0, control circuit 210 according to the third embodiment performs the process of stopping switching of chopper circuit 13-1, which is one of the two chopper circuits 13-1 and 13-2, to intentionally destroy the balance between respective magnitudes of reactor current I1 and I2. This method can also intentionally destroy the balance between respective magnitudes of reactor currents I1 and I2, and the ripple component of the current flowing in DC power supply B1 can be increased, like the first embodiment.

Fourth Embodiment

In the above-described third embodiment, the single switching-off process is performed on only the chopper circuit 13-1.

In contrast, a fourth embodiment is based on a similar concept to the second embodiment and switches, each time a predetermined condition is satisfied, the circuit to be subjected to the single switching-off process between chopper circuit 13-1 and chopper circuit 13-2. This is a feature of the fourth embodiment. Since other structural characteristics, functions, and processes are similar to those of the above-described first embodiment, the detailed description thereof will not be repeated here.

Figure 9:
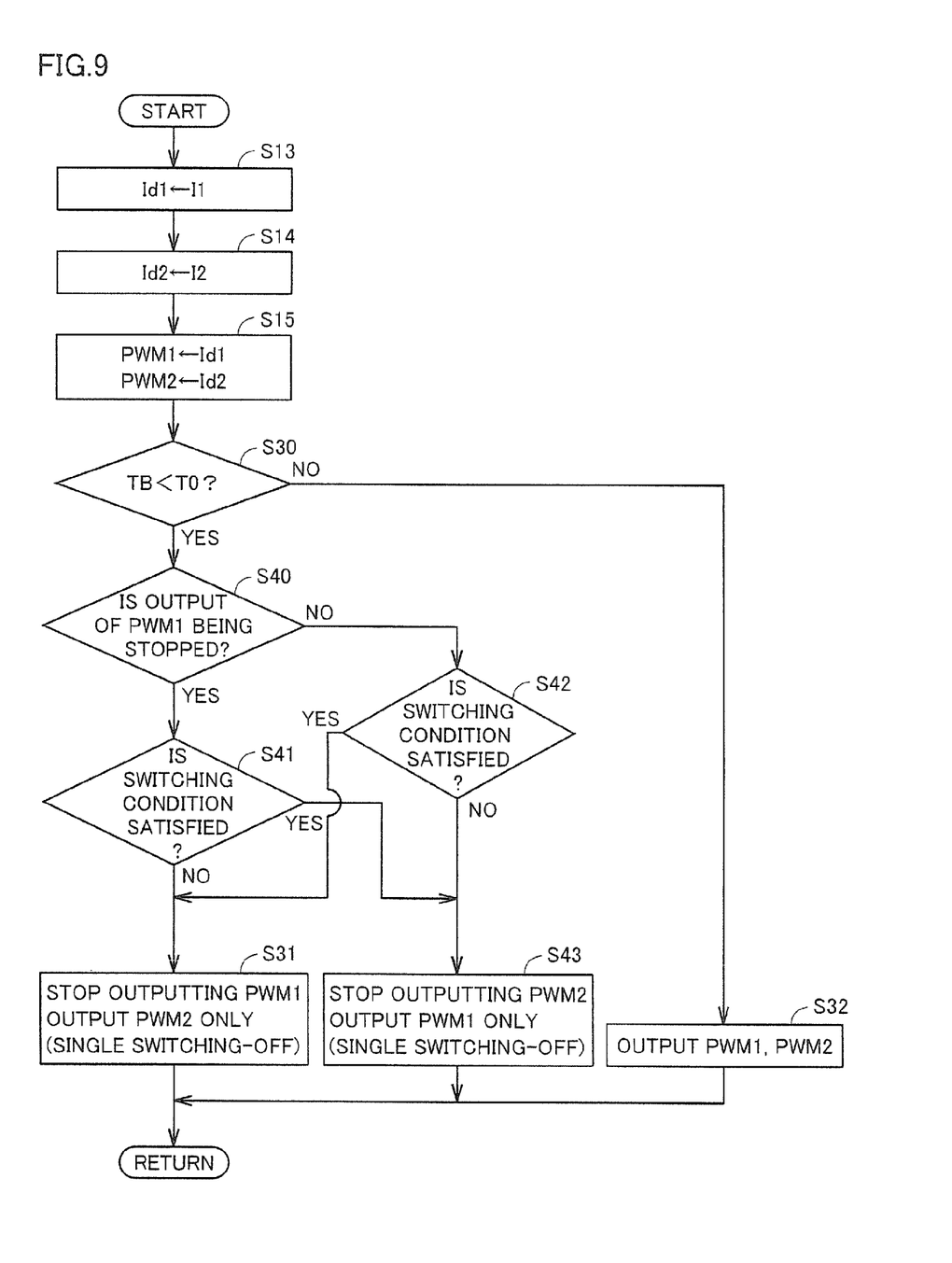
FIG. 9 is a (fourth) flowchart showing a process procedure of the control circuit.

FIG. 9 is a flowchart showing a process procedure performed by control circuit 210 according to the fourth embodiment. It is noted that any process in the flowchart shown in FIG. 9 that is identical to a corresponding process in the above-described flowchart shown in FIG. 8 is denoted by the same step number as that in FIG. 8. Details of these processes are also identical to each other. Therefore, the detailed description thereof will not be repeated here in principle.

In the case where temperature TB is lower than reference temperature T0 (YES in S10), control circuit 210 determines in S40 whether or not output of signal PWM1 is being stopped.

In the case where output of signal PWM1 is being stopped (YES in S40), control circuit 210 determines in S41 whether or not a predetermined switching condition is satisfied. This switching condition may be set based on a similar concept to the concept described above in connection with the process of S21 in FIG. 6. For example, the condition that stoppage of output of signal PWM1 is continued for a period longer than a predetermined period may be used as a switching condition.

In the case where the switching condition is not satisfied (NO in S41), control circuit 210 continues stopping output of signal PWM1 (S31). In contrast, in the case where the switching condition is satisfied (YES in S41), control circuit 210 switches the signal to be subjected to the single switching-off process from signal PWM1 to signal PWM2. Specifically, in S43, control circuit 210 stops outputting signal PWM2 and outputs only the signal PWM1.

Likewise, in the case where output of signal PWM2 is being stopped (NO in S40), control circuit 210 determines in S42 whether or not a predetermined switching condition is satisfied. The switching condition may be set based on a similar concept to the concept described above in connection with the process of S41.

In the case where the switching condition is not satisfied (NO in S42), control circuit 210 continues stopping output of signal PWM2 (S43). In contrast, in the case where the switching condition is satisfied (YES in S42), control circuit 210 switches the signal to be subjected to the single switching-off process from signal PWM2 to signal PWM1 (S31).

Thus, the fourth embodiment switches the signal to be subjected to the single switching-off process between signal PWM1 and signal PWM2 each time the switching condition is met. Accordingly, even when the single switching-off process is continued for a relatively long period of time, the load can be prevented from being exerted excessively on one of the reactors and the controllability of multi-phase converter 12 can be prevented from being deteriorated.

It should be construed that embodiments disclosed herein are by way of illustration in all respects, not by way of limitation. It is intended that the scope of the present invention is defined by claims, not by the above description, and encompasses all modifications and variations equivalent in meaning and scope to the claims.

REFERENCE SIGNS LIST 12 multi-phase converter; 13-1, 13-2 chopper circuit; 14 inverter; 15 U phase arm; 16 V phase arm; 17 W phase arm; 20, 22 voltage sensor; 21, 27, 28 temperature sensor; 24, 25, 26 current sensor; 29 accelerator pedal position sensor; 200 motor drive; 210 control circuit; 220 load; 241, 242 coil winding; 250 core; 251a, 251b outer leg; 252 central leg; 253 gap; 300 voltage command setting unit; 310 subtraction unit; 320 control calculation unit; 325 multiplication unit; 330 current control unit; 331 first current control unit; 332 second current control unit; 350 modulation unit; 351 first modulation unit; 352 second modulation unit; 360 determination unit; B1 DC power supply; C0, C1 smoothing capacitor; D11, D12, D21, D22 diode; GL ground line; L1, L2 reactor; M1 AC motor; PL power supply line; Q11, Q12, Q21, Q22 switching element

The invention claimed is:

1. A power supply device comprising:
   a multi-phase converter including first and second chopper circuits connected in parallel between a power supply line connected to a load and a power supply of direct current,
   said first chopper circuit including a first switching circuit and a first reactor disposed to pass electric current in response to operation of said first switching circuit,
   said second chopper circuit including a second switching circuit and a second reactor disposed to pass electric current in response to operation of said second switching circuit,
   said first reactor and said second reactor being arranged to be magnetically coupled to each other;
   a first sensor detecting a value of current flowing in said first reactor; and
   a second sensor detecting a value of current flowing in said second reactor; and
   a control circuit controlling, in a case of a low-temperature state in which a temperature of said power supply is lower than a predetermined value, said first and second chopper circuits so that a difference between the value of current flowing in said first reactor and the value of current flowing in said second reactor is increased relative to a case of a non-low-temperature state in which the temperature of said power supply higher than said predetermined value, to thereby increase a ripple component of current flowing in said power supply,
   said control circuit including:
      a setting unit setting a voltage command value for said power supply line based on an operating state of said load; and
      a control unit controlling said first chopper circuit in accordance with a result of a first calculation performed based on said voltage command value and the value detected by said first sensor and controlling said second chopper circuit in accordance with a result of a second calculation performed based on said voltage command value and the value detected by said second sensor,
      in a case of said low-temperature state, said control unit performing an offset process of adding a predetermined amount to the value detected by one of said first sensor and said second sensor to thereby increase a difference between the value of current flowing in said first reactor and the value of current flowing in said second reactor.

2. The power supply device according to claim 1, wherein each time a predetermined condition is satisfied, said control unit switches a detected value to be subjected to said offset process, between the value detected by said first sensor and the value detected by said second sensor.

3. The power supply device according to claim 1, wherein
said first switching circuit includes first and second switching elements connected in series between a ground line and said power supply line,
said second switching circuit includes third and fourth switching elements connected in series between said ground line and said power supply line,
said first reactor has a first coil winding connected between said power supply and a point of connection of said first and second switching elements,
said second reactor has a second coil winding connected between said power supply and a point of connection of said third and fourth switching elements, and
said first and second coil windings are wound around different portions of a common core.

4. The power supply device according to claim 1, wherein said control unit changes said predetermined amount depending on the temperature of said power supply.

5. A power supply device comprising:
a multi-phase converter including first and second chopper circuits connected in parallel between a power supply line connected to a load and a power supply of direct current,
said first chopper circuit including a first switching circuit and a first reactor disposed to pass electric current in response to operation of said first switching circuit,
said second chopper circuit including a second switching circuit and a second reactor disposed to pass electric current in response to operation of said second switching circuit,
said first reactor and said second reactor being arranged to be magnetically coupled to each other; and
a control circuit controlling, in a case of a low-temperature state in which a temperature of said power supply is lower than a predetermined value, said first and second chopper circuits so that a difference between a value of current flowing in said first reactor and a value of current flowing in said second reactor is increased relative to a case of a non-low-temperature state in which the temperature of said power supply is higher than said predetermined value, to thereby increase a ripple component of current flowing in said power supply,
said control circuit performing a stoppage process of stopping operation of one of said first chopper circuit and said second chopper circuit in a case of said low-temperature state, and
each time a predetermined condition is satisfied, said control circuit switching a chopper circuit to be subjected to said stoppage process, between said first chopper circuit and said second chopper circuit.

6. The power supply device according to claim 5, wherein
said first switching circuit includes first and second switching connected in series between a ground line and said power supply line,
said second switching circuit includes third and fourth switching elements connected in series between said ground line and said power supply line,
said first reactor has a first coil winding connected between said power supply and a point of connection of said first and second switching elements,
said second reactor has a second coil winding connected between said power supply and a point of connection of said third and fourth switching elements, and
said first and second coil windings are wound around different portions of a common core.

* * * * *

UNITED STATES PATENT AND TRADEMARK OFFICE
CERTIFICATE OF CORRECTION

PATENT NO. : 8,750,008 B2  
APPLICATION NO. : 13/574289  
DATED : June 10, 2014  
INVENTOR(S) : Yoshinobu Sugiyama et al.

Page 1 of 1

It is certified that error appears in the above-identified patent and that said Letters Patent is hereby corrected as shown below:

On the Title Page

Please delete the following:

Item "(73)   Assignee: Toyota Jidoha Kabushiki, Toyota (JP)"

And replace with:

Item (73)   Assignee: Toyota Jidosha Kabushiki Kaisha, Toyota (JP)

Signed and Sealed this  
Twenty-third Day of September, 2014

Michelle K. Lee  
*Deputy Director of the United States Patent and Trademark Office*